(12) United States Patent
Chang

(10) Patent No.: US 9,152,855 B2
(45) Date of Patent: Oct. 6, 2015

(54) ENHANCED OBJECT DETECTION METHOD USING IMAGE DISCONTINUOUSNESS

(71) Applicant: QNAP Systems, Inc., New Taipei (TW)

(72) Inventor: Tien Lung Chang, New Taipei (TW)

(73) Assignee: Qnap Systems, Inc., New Taipei (TW)

( * ) Notice: Subject to any disclaimer, the term of this patent is extended or adjusted under 35 U.S.C. 154(b) by 264 days.

(21) Appl. No.: 13/803,832

(22) Filed: Mar. 14, 2013

(65) Prior Publication Data

US 2014/0226853 A1   Aug. 14, 2014

(30) Foreign Application Priority Data

Feb. 8, 2013   (TW) .............................. 102105090 A

(51) Int. Cl.
*G06K 9/00*      (2006.01)
(52) U.S. Cl.
CPC .................................. *G06K 9/00362* (2013.01)

(58) Field of Classification Search
None
See application file for complete search history.

(56) References Cited

U.S. PATENT DOCUMENTS

| | | | |
|---|---|---|---|
| 2010/0268223 A1* | 10/2010 | Coe et al. .......................... 606/41 |
| 2011/0038510 A1* | 2/2011 | Nakamura ..................... 382/106 |
| 2012/0057049 A1* | 3/2012 | Imagawa et al. .............. 348/234 |

* cited by examiner

*Primary Examiner* — Siamak Harandi
(74) *Attorney, Agent, or Firm* — Muncy, Geissler, Olds & Lowe, P.C.

(57) ABSTRACT

An enhanced object detection method uses image discontinuousness for enhancing performance of identifying objects of a specific class in an image data. The method includes retrieving an image data; computing an image discontinuousness value between a first area and other areas surrounding of the first area, which is with different sizes and in different positions within the image data, and marking areas with an image discontinuousness value larger than a threshold; and identifying the objects of the specific class within the sliding window and outputting detection result.

9 Claims, 5 Drawing Sheets

ENHANCED OBJECT DETECTION METHOD USING IMAGE DISCONTINUOUSNESS

CROSS-REFERENCES TO RELATED APPLICATIONS

This non-provisional application claims priority under 35 U.S.C. §119(a) on Patent Application No. 102105090 filed in Taiwan, R.O.C. on Feb. 8, 2013, the entire contents of which are hereby incorporated by reference.

BACKGROUND

1. Technical Field

This disclosure relates to an object detection method, and more particularly to an enhanced object detection method, which uses image discontinuousness to improve the quality of object detection and to shorten the time required for object detection.

2. Related Art

For data process device, detecting humans or objects of specific class in an image involves numerical computation, different from human brain logics. Object detection is widely used in monitoring, automated machinery (robot), or environmental monitoring.

Take human detection as an illustration, body size, posture, clothing, image capturing angle, light, and image quality all influence appearance of people in images, so the detection can not be accomplished by simple comparison of image characteristics but by relatively complex computation mechanism.

In the above computation mechanism, the common used calculation basis is Histograms of Oriented Gradients (HOG) proposed by Dalal et al. HOG counts occurrences of gradient orientation of pixels in a localized portion of an image as the feature of the localized portion and then uses support vector machine to perform detection.

However, the requirement for resolution or clarity is relatively high for HOG, and the object may not be detected if the resolution is low or the edge of the object is blurred due to noises. Besides, often HOG doesn't detect the complete object but part of the object, the representative vector dimensions of the object in HOG are so large that the computation is heavy and that the HOG is difficult to used in real-time applications. Therefore, there is still room for the improvement of HOG, and improvement methods are continuously proposed as well.

SUMMARY OF THIS DISCLOSURE

In view of the above problems, this disclosure provides an enhanced object detection method, which uses image discontinuousness for enhancing the performance of identifying objects of a specific class in an image data, so as to mark areas with the objects of the specific class quickly in the condition of low image quality.

The enhanced object detection method includes the steps of: retrieving an image data; computing an image discontinuousness value between a first area and other areas surrounding of the first area, which is with different sizes and in different positions within the image data, and marking areas with an image discontinuousness value larger than a threshold; and identifying the objects of the specific class within the marked areas, and outputting a detection result.

This disclosure also provides an image discontinuousness value computing method. The image discontinuousness value computing method includes the steps of: computing the edge strength of each pixel within the image data; choosing one of the pixels, and detecting an optimal edge path starting from the pixel; comparing the edge strengths of the adjacent pixels of the chosen pixel, and the pixel with largest edge strength is the next pixel to be chosen for the path; connecting all chosen pixels to be a first optimal edge path, and then computing the statistical edge strength of all pixels on the first optimal edge path as the image discontinuousness value of areas on both sides of the first optimal edge path; if an image discontinuousness value of a first area and other areas surrounding the first area is larger than a threshold, determining that an independent object of the specific class may be in the first area; marking the areas with objects of the specific class by an enclosed border line, so as to label the positions of the objects of the specific class in the image data; and identifying the objects of the specific class within the first area, and then outputting the detection result.

Based on the edge strength of each pixel, this disclosure builds a first optimal edge path and finds outs areas with the largest discontinuousness from the surrounding areas, so as to mark the independent object of the specific class within an enclosed border line. The usage of the discontinuousness could lower the requirement of the image quality and reduce the detection computation.

The detail of this disclosure can be better appreciated from the following detailed description of this disclosure, taken in conjunction with the attached drawings.

BRIEF DESCRIPTION OF THE DRAWINGS

This disclosure will become more fully understood from the detailed description given herein below for illustration only, and thus not limitative of this disclosure, wherein.

DETAILED DESCRIPTION OF THE DISCLOSURE

Figure 1:
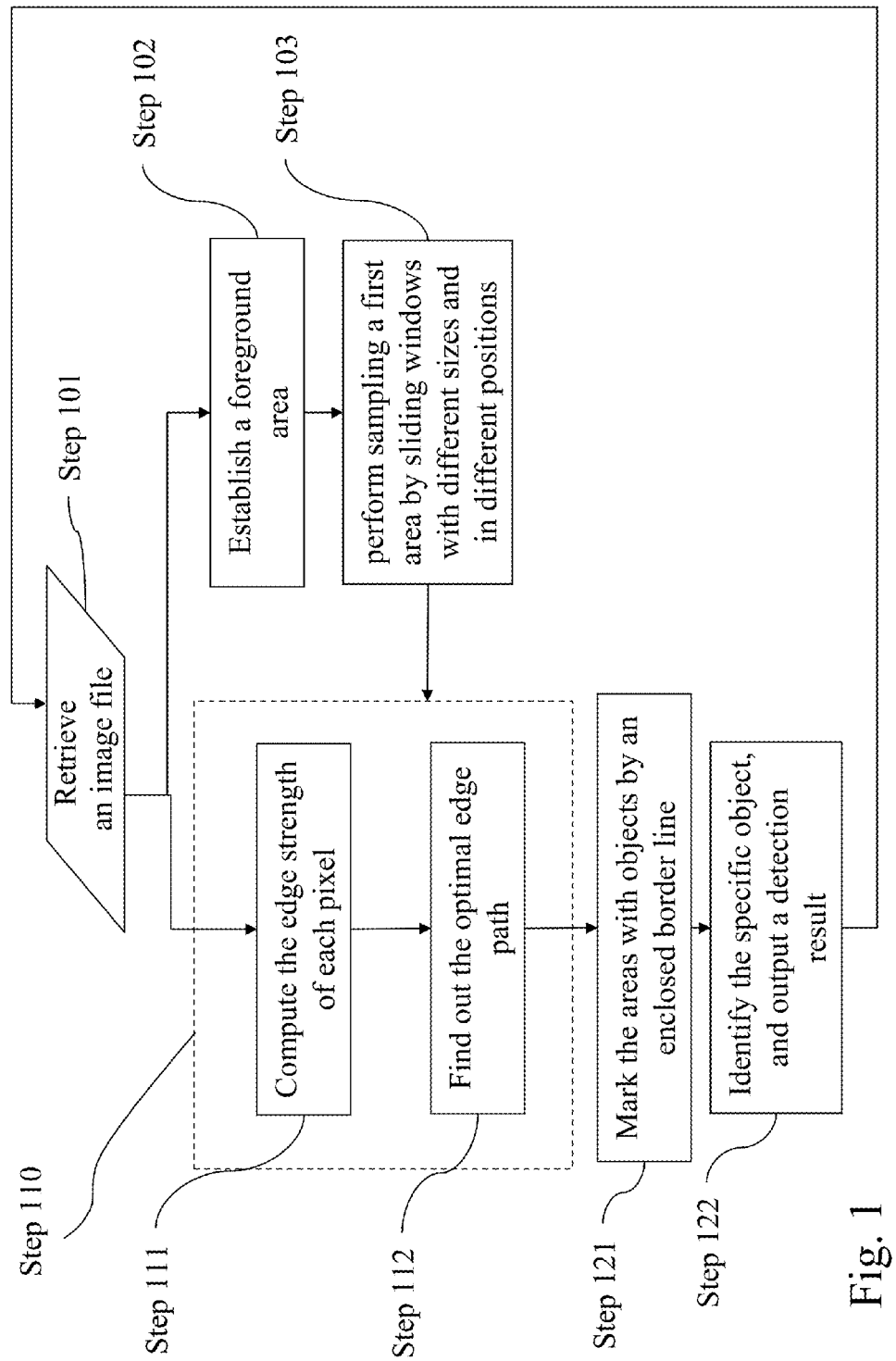
FIG. 1 is a flow chart of the enhanced object detection method using image discontinuousness.

Refer to FIG. 1, which shows an enhanced object detection method using image discontinuousness. The enhanced object detection method enhances the performance of identifying objects of a specific class in an image data, so as to quickly detect and mark areas with the objects of the specific class in the condition of low image quality. The image data is a frame of an image or a frame of a video, for example. The objects of the specific class should be discontinuous to other objects and backgrounds. The image discontinuousness value computing method is provided as well in this disclosure. The image discontinuousness value computing method is based on building a first optimal edge path according to edge strength of each pixel. The enhanced object detection method includes steps of:

Step 101: the detection system retrieves an image data. The image data can be loaded from an image capture device instantly/with delay or from one data storage. The image data can be a static image or an image frame extracted from a continuous streaming video or a picture of an image.

Step 102: the detection system establishes a foreground area by a foreground unit. Unnecessary background patterns are removed, so as to mark the foreground area as the image data. If the image data is relatively small such as low pixels, the Step 102 can be omitted and Step 103 is directly performed without performing Step 102 in advance. Foreground establishing method includes background subtraction, image sequence change detection, and light changes. People having ordinary skill in the art can make proper modification to the foreground establishing method according to the actual needs or design requirements, not limited as described herein. The inventor will not describe details hereinafter.

Figure 2:
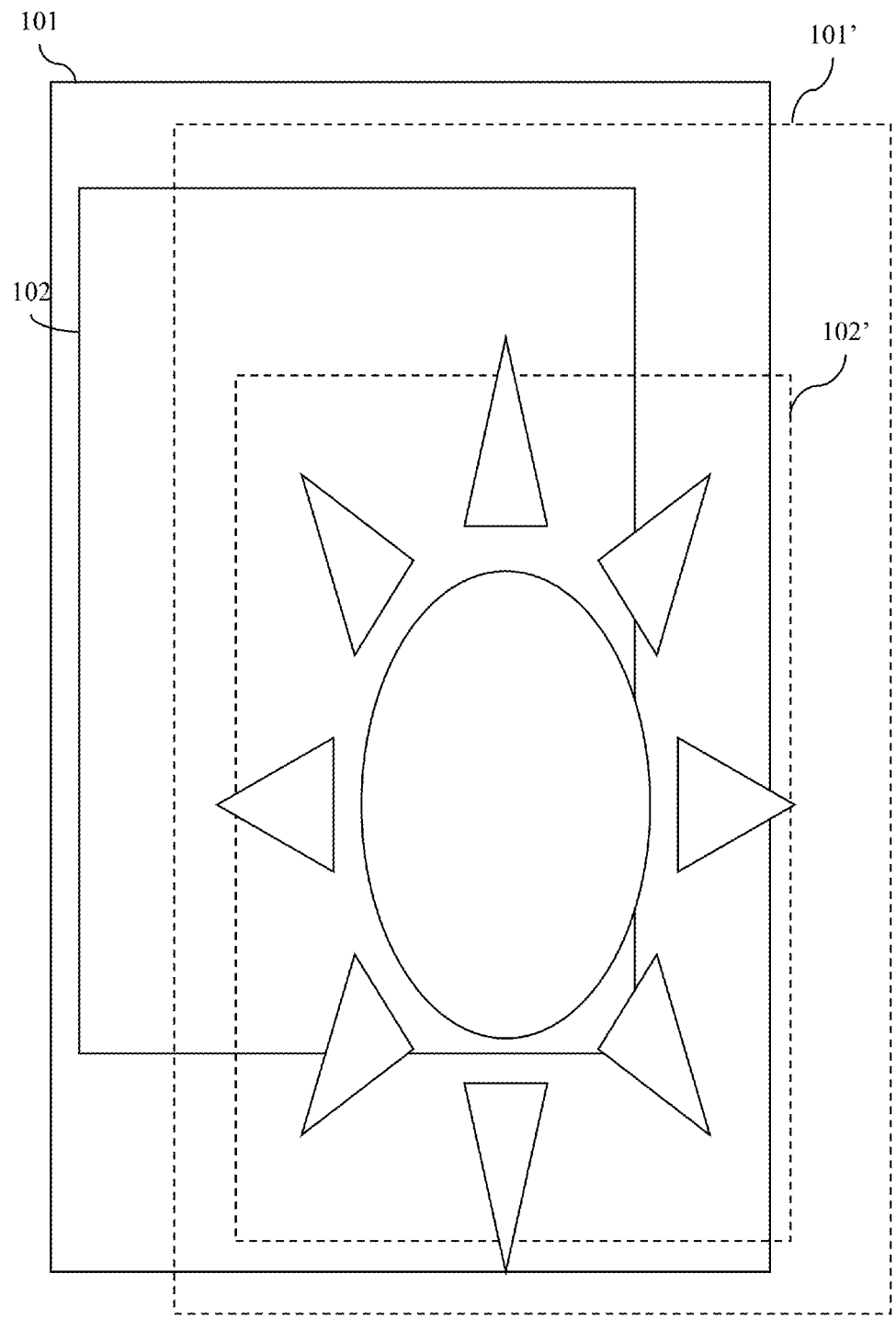
FIG. 2 is a schematic view of the sampling by the sliding windows with different sizes and in different positions.

Step 103: referring to FIG. 2, the detection system performs sampling a first area by sliding windows with different sizes and in different positions in the whole image data or in the foreground. A first rectangle sliding window with size one 101 or 101' are moved in the whole image or the foreground area to take samples, and then a second rectangle sliding window with size two 102 or 102' are moved to take samples. The size of the first window is larger than that of the second window in this embodiment. That is, plural first areas with different sizes and in different positions within the image data will be sampled. The sizes of the first and second windows could be the same or different. The shapes of the first and second window could be but not limit to a rectangle, other shapes such as a circular, a hexagon, or a polygon can be used.

Step 110: the detection system computes image discontinuousness values. An image discontinuousness value between the first area and other areas surrounding the first area is computed, wherein the first area is with different sizes and in different positions within the image data. Then, the detection system marks areas with an image discontinuousness value larger than a threshold, so as to execute the next steps Step 121 and Step 122, the detection system identifies the objects of the specific class within the image data within the marked areas, and output a detection result.

The image discontinuousness value computing method is described in the followings:

Step 111: the detection system computes the edge strength of each pixel within the image data. The edge strength computing method could be but not limits to the gradient of the image brightness l, and the edge strength value can be normalized by a function to increase numerical stability, such as:

$$g(l) = \frac{1}{1 + \exp(-\|l\| - 20)}.$$

For a pixel $p_i = (x_i, y_i)$, $S(p_i)$ represents the edge strength of the pixel. The statistical edge strength of an optimal edge path starting from $p_1$ with length h is:

$$M(p_1, h) = \frac{1}{h} \sum_{i=1}^{n} S(p_i).$$

Figure 4:
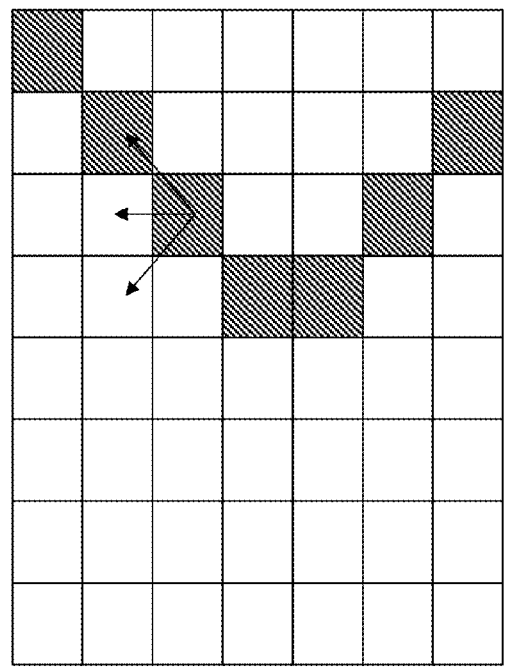
FIG. 3 and FIG. 4 are schematic views illustrate the optimal edge path is generated according to the image discontinuousness values of the adjacent pixels.
Figure 3:
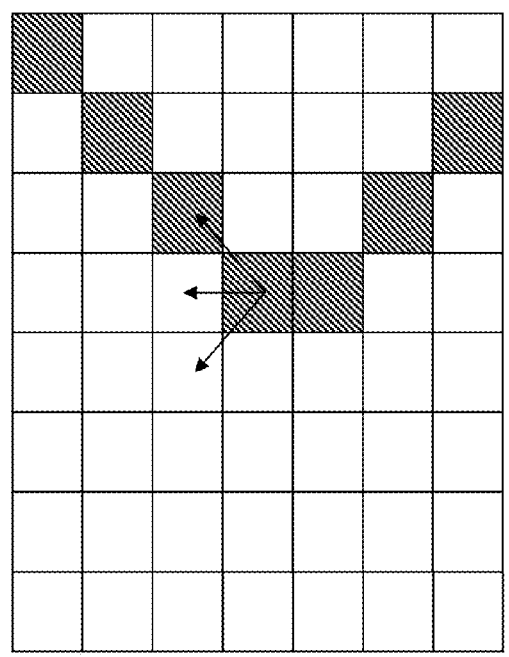

Step 112: the detection system finds out the optimal edge path according to the edge strengths of the pixels. Refer to FIG. 3 and FIG. 4, the detection system chooses one of the pixels to find out the optimal edge path starting from the pixel and compares the edge strengths of adjacent pixels of the chosen pixel as the equation:

$$p_i = \left( \underset{x_{i-1}-1 \leq x \leq x_{i-1}+1, y=y_{i-1}-1}{\operatorname{argmax}} S(x, y) \right),$$

The pixel with the largest edge strength is the next pixel to be chosen for the path. Then the detection system connects all chosen pixels to be a first optimal edge path, and computes the statistical edge strength of all pixels on the first optimal edge path as the image discontinuousness value of areas on both sides of the first optimal edge path. If the image discontinuousness value of the first area and other areas surrounding the first area is larger than a threshold, the detection system determines an independent object of the specific class may be in the first area.

Step 121: the detection system marks the areas with the objects of the specific class by an enclosed border line, so as to label the positions of the objects in the image data (Step 121).

Finally, the detection system identifies the objects of the specific class within the areas, and then outputs the detection result (Step 122).

Figure 5:
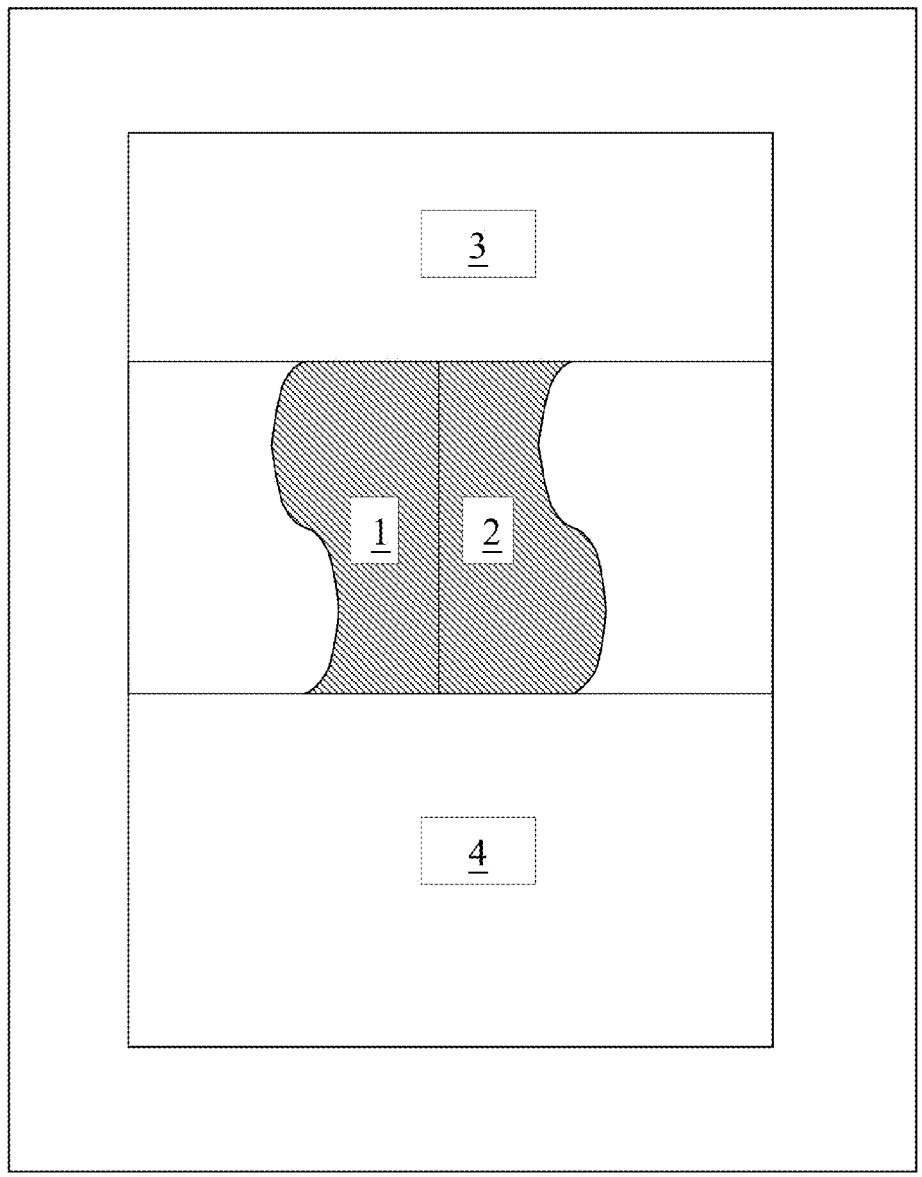
FIG. 5 is a schematic view illustrates the sliding windows is able to take samples from large scope to small scope.

Refer to FIG. 5, blocks 1 to 4 are combined into a first rectangle sliding window 101. The curve in the block 1 is the first optimal edge path from bottom to top with the largest statistical edge strength. When the edge strength is larger than a threshold, it means that the hatching area is discontinuous to the left white area. We can know whether hatching area is discontinuous to the right white area in the same way. The method in this disclosure is able to determine whether the central area in the sliding window is continuous to the upper and the lower area as well if the directions of x and y are interchanged. Combining the discontinuousness determinations along x direction and y direction, the detection system is able to determine whether the image discontinuousness value of the first rectangle sliding window 101 is larger than the threshold according to the default value or a value input by users. When the technique is used combined with HOG, whether central region is discontinuous to the upper and lower region is not an issue which needs to be concerned.

Refer to FIG. 2. In the embodiment, the sun shaped pattern is the object that required to be detected, and the sliding window takes samples from large to small scope. The steps are described in the followings:

(1) Defining first rectangle sliding windows (or windows with other shapes) with the largest size 101 and 101'. According to a threshold which is default value or input by users, the detection system detects the areas with an image discontinuousness value larger than the threshold within the first rectangle sliding windows, so as to mark the area with larger image discontinuousness. The first rectangle sliding windows 101 and 101' are possible to be both preserved, to be preserved by only one, or to be both ruled out. The first rectangle sliding windows 101 and 101' are both preserved in the embodiment.

(2) Defining second rectangle sliding windows (or windows with other shapes) with smaller size 102 and 102', and then sampling in the area of the rectangle sliding windows 102 and 102'. According to a threshold which is default value or input by users, the detection system detects the areas with an image discontinuousness value larger than the threshold within the second rectangle sliding windows, so as to mark the area with larger image discontinuousness. The second rectangle sliding windows 102 and 102' are possible to be both preserved, be preserved by only one, or be both ruled out. The second rectangle sliding window 102 is ruled out and the second rectangle sliding window 102' is preserved in the embodiment.

(3) Choosing the area with the maximum image discontinuousness value as an optimal detection result. Take rectangle sliding windows 101, 101', and 102' preserved after step 1 and step 2 as an illustration. Firstly, the detection system detects a plurality of areas with objects of the specific class; for example the detection system computes the image discontinuousness values of rectangle sliding windows 101, 101', and 102'.

If the image discontinuousness values are X, Y, and Z, X<Y<Z, and XYZ≠0, then the detection system determines whether the areas overlap over a pre-determined proportion. If the areas overlap over a pre-determined proportion, for example, the intersection area of the rectangle sliding windows 101 and 101' is larger than half of the area of the union of the two windows, the detection system chooses the area with a larger image discontinuousness value as the first candidate detection result.

Figure 6:
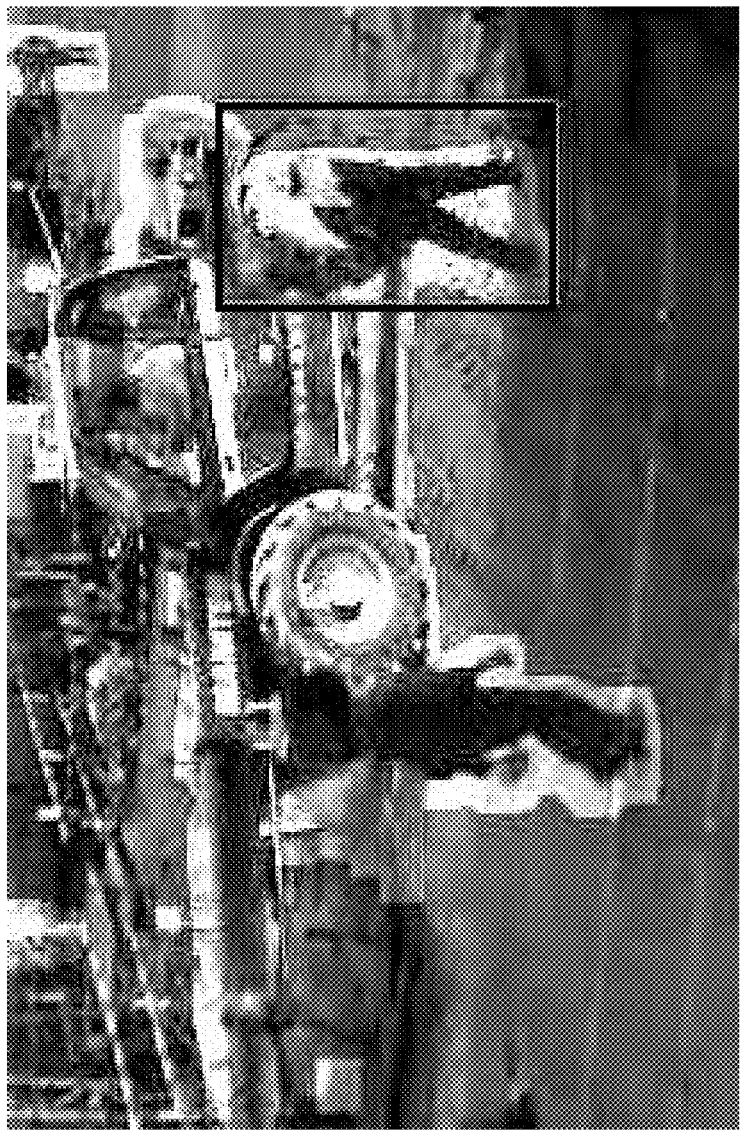
FIG. 6 is a schematic view of an object marked by an enclosed border line in an image.

In this embodiment, the intersection area of the rectangle sliding windows 101 and 101' is larger than half of the area of the union of the two windows and X<Y, the system choose rectangle sliding window 101' as the first candidate detection result. Then the system determines whether the first candidate detection result overlaps the next rectangle sliding window 102' over a pre-determined proportion. In this embodiment, the intersection area of the rectangle sliding windows 101' and 102' is larger than half of the area of the union of the two windows and Y<Z, and the system chooses the rectangle sliding window 102' as the second candidate detection result. After the system identifies that the second candidate detection result 102' has the maximum image discontinuousness value, the system outputs the area 102' as an optimal detection result. As the enclosed border line in FIG. 6, users will see the optimal detection result chosen by the detection system.

In another embodiment, the rectangle sliding windows 101 and 101' does not overlap over a pre-determined proportion, for example, the intersection area of the rectangle sliding windows 101 and 101' is not larger than half of the area of the union of the two windows. The rectangle sliding window 102' will be further respectively compared with the first rectangle sliding window 101 and 101'. If the intersection area of the rectangle sliding windows 101 and 102' is not larger than half of the area of the union of the two windows, and the intersection area of the rectangle sliding windows 101' and 102' is not larger than half of the area of the union of the two windows, the detection system chooses the areas corresponds to a plural of optimal detection results severally and outputs the optimal detection result, such that users will see three best border line enclosed detection result displayed on the output device.

In this disclosure, based on building the first optimal edge path according to the edge strengths, areas with the largest image discontinuousness from the surrounding are found, so as to quickly find out the independent object and then display a border line enclosed object on the screen or any output device, making users recognize the positions of the detected objects. The application of image discontinuousness could lower the requirement of the image quality, reduce the detection computation, and decrease the possibility of false detection.

Though the embodiments of this disclosure are disclosed as described above, this is not to limit this disclosure. People having ordinary skill in the art will recognize that this disclosure can be practiced with modification within the spirit and scope of the claim. It is therefore to be understood that this disclosure is not to be limited by the foregoing description but only by the appended claims.

What is claimed is:

1. An enhanced object detection method using image discontinuousness, for enhancing performance of identifying objects of a specific class in an image data, comprising:
    retrieving an image data;
    computing an image discontinuousness value between a first area and other areas surrounding of the first area, which is with different sizes and in different positions within the image data, and marking areas with an image discontinuousness value larger than a threshold; and
    identifying objects of a specific class within the marked areas, and outputting a detection result,
    wherein the step of computing an image discontinuousness value between a first area and other areas surrounding of the first area, which is with different sizes and in different positions within the image data, and marking areas with an image discontinuousness value larger than a threshold further includes steps of:
    defining a first sliding window, and detecting the area with the image discontinuousness value larger than the threshold within the first sliding window, so as to mark the area with larger image discontinuousness; and
    defining a second sliding window within the above marked area, sampling in the second window, and detecting the area with the image discontinuousness value larger than the threshold, so as to mark at least one or more of the area with larger image discontinuousness.

2. The enhanced object detection method as claimed in claim 1, wherein the image data is loaded from an image capture device instantly or from a data storage.

3. The enhanced object detection method as claimed in claim 1, wherein the image data is a static image or an image frame extracted from a continuous streaming video.

4. The enhanced object detection method as claimed in claim 1, further including a step: establishing at least one foreground region within the image data after the step of retrieving the image data.

5. The enhanced object detection method as claimed in claim 1, wherein the step of computing an image discontinuousness value between a first area and other areas surrounding of the first area, which is with different sizes and in different positions within the image data further includes:
    computing the edge strength of each pixel within the image data; and
    finding out a first optimal edge path, including steps of:
        choosing one of the pixels, and detecting an optimal edge path starting from the pixel;
        comparing the edge strengths of adjacent pixels of the chosen pixel, and the pixel with the largest edge strength is the next pixel to be chosen for the path; and
        connecting all chosen pixels to be the first optimal edge path, and then computing the statistical edge strength of all pixels on the first optimal edge path as the image discontinuousness value of areas on both sides of the first optimal edge path.

6. The enhanced object detection method as claimed in claim 1, wherein the step of identifying the objects of the specific class within the marked areas, and outputting a detection result further includes: marking the areas with the objects of the specific class by an enclosed border line, so as to label the positions of the objects of the specific class in the image data; and identifying the objects of the specific class within the areas, and outputting the detection result.

7. The enhanced object detection method as claimed in claim 6,
wherein the step of identifying the objects of the specific class within the areas, and outputting a detection result further includes:
detecting a plurality of areas with objects of the specific class;
determining whether the areas overlap over a pre-determined proportion; and
choosing an area with a maximum image discontinuousness value as an optimal detection result if the areas overlap over the pre-determined proportion, and outputting the optimal detection result.

8. The enhanced object detection method as claimed in claim 6, wherein the step of identifying the objects of the specific class within the areas, and outputting a detection result further includes:
detecting a plurality of areas with objects of the specific class;
determining whether the areas overlap over a pre-determined proportion; and
choosing the areas corresponds to a plural of optimal detection results severally if the areas do not overlap over the pre-determined proportion, and outputting the optimal detection result.

9. An enhanced object detection method using image discontinuousness, for enhancing performance of identifying objects of a specific class in an image data, comprising:
retrieving an image data;
computing an image discontinuousness value between a first area and other areas surrounding of the first area, which is with different sizes and in different positions within the image data, and marking areas with the image discontinuousness value larger than a threshold; and
identifying objects of a specific class within the marked areas, and outputting a detection result,
wherein the step of computing an image discontinuousness value between a first area and other areas surrounding of the first area, which is with different sizes and in different positions within the image data further includes steps of:
computing edge strength of each pixel within the image data; and
finding out a first optimal edge path, including steps of:
choosing one of the pixels, and detecting an optimal edge path starting from the pixel;
comparing the edge strengths of adjacent pixels of the chosen pixel, and the pixel with the largest edge strength is the next pixel to be chosen for the path; and
connecting all chosen pixels to be the first optimal edge path, and then computing the statistical edge strength of all pixels on the first optimal edge path as the image discontinuousness value of areas on both sides of the first optimal edge path.

* * * * *